US005131966A

United States Patent [19]

Coffey

[11] Patent Number: 5,131,966

[45] Date of Patent: Jul. 21, 1992

[54] VARIABLE SIZE ROTARY IMPACT CYLINDER COUPLE

[75] Inventor: James B. Coffey, Dayton, Ohio

[73] Assignee: NCR Corporation, Dayton, Ohio

[21] Appl. No.: 711,678

[22] Filed: Jun. 6, 1991

Related U.S. Application Data

[62] Division of Ser. No. 552,668, Jul. 16, 1990, abandoned.

[51] Int. Cl.[5] .............. B32B 31/00

[52] U.S. Cl. .............. 156/64; 156/296; 156/553; 270/53

[58] Field of Search .............. 156/296, 553, 556, 64; 270/53

[56] References Cited

U.S. PATENT DOCUMENTS

| | | | |
|---|---|---|---|
| 3,727,908 | 4/1973 | Whitesell et al. | 270/53 |
| 4,057,185 | 11/1977 | Slama et al. | 226/1 |
| 4,159,823 | 7/1979 | Bryer et al. | 270/21 |
| 4,166,613 | 9/1979 | Kort et al. | 270/21 |
| 4,207,814 | 6/1980 | Schenk | 101/76 |
| 4,380,449 | 4/1983 | Michalik | 493/424 |
| 4,422,630 | 12/1983 | Trentman | 270/53 |
| 4,484,522 | 11/1984 | Simeth | 101/248 |
| 4,902,366 | 2/1990 | Bader | 156/296 |
| 4,919,738 | 4/1990 | Ball et al. | 156/73.5 |

*Primary Examiner*—David A. Simmons
*Assistant Examiner*—Robert Barker
*Attorney, Agent, or Firm*—Albert L. Sessler, Jr.

[57] ABSTRACT

A variable size rotary impact cylinder couple comprises a lower or anvil cylinder (which may be 22 inches in circumference) driven by a swing gear and a top impact cylinder driven by a servo motor which is adjustable in a vertical direction. The cylinder couple provides impacting in the manner of ironing or squeezing cross-web glue lines between adjacent paper parts. The cylinder couple provides for 1, 2, 3, 4, 5, 6 and 8-around impacting positions for cylinder circumference of 17, 19, 21, 22, 24, $25\frac{1}{2}$ and 28 inches. The self contained cylinder couple is used with a rotary collator to produce various sizes of cross-web glued forms. The combination drive system provides a single cylinder couple that emulates various printing cylinder sizes.

3 Claims, 7 Drawing Sheets

VARIABLE SIZE ROTARY IMPACT CYLINDER COUPLE

This is a division of application Ser. No. 07/552,668, filed Jul. 16, 1990 now abandoned.

BACKGROUND OF THE INVENTION

In the field of machines for producing business forms, the use of high speed gluing machines is an important part of a process line. The process of impacting cross-web applied glue lines in the production of such business forms is a means for improving the quality of a collated form. The action of impacting the glue lines in producing such business forms also enables an increase in the running speed of the process line.

Impacting cylinders are commonly used to iron or squeeze glue lines between two adjacent paper parts. The impacting ensures that all areas of the glue lines between the adjacent paper parts or webs are squeezed together after partial drying and at a time when the glue is very tacky so as to permanently join the parts. The impacting also reduces the overall thickness of the joined parts by compressing the glue line so as to assure a minimum thickness of the glue lines and of the collated form. A minimum thickness of the business form is an important feature in the production of continuous mailer products.

The impacting process is accomplished by applying strips of rubber at spaced locations around the circumference of the impacting cylinder which is adjacent to and driven by an anvil cylinder. A distance of 8 to 15 feet between the glue applicator and the impacting cylinder allows a desirable wetting time for the glue to be absorbed into the paper and also allows partial drying of the applied glue lines to obtain the very tacky condition.

In present day operations, the rubber strips may be applied at a certain distance on the periphery of the cylinder for certain spacing of glue lines on the paper web, and the strips may be applied at a different distance for different spacing of glue lines. This procedure requires that the cylinder has to be removed from the process line and reformed to accommodate various distances of glue lines for different size business forms.

Various sizes of impacting cylinders have been used as a part of the collating process for a number of years. Servo-drive mechanisms have been used for numerous operations wherein a cylinder is positioned in a repetitive fashion to perform some useful function or operation.

It is also common knowledge that the rubber strips are used in conjunction with the impacting cylinders and that cross-perforating cylinders for producing perforations across the web and cutoff cylinders for providing a sheeted product are used on rotary collators by numerous machine builders. However, heretofore, a variable size rotary cylinder couple meant that if a change in circumference was required, one size of cylinder couple had to be removed and replaced with a different size cylinder couple. Thus, it is seen that the conventional method used to change to a different size is to change the cylinder couple. Normally, this change can be made in one of two ways. Using one method requires changing both the top and bottom cylinders of a couple which is constructed as a set. Another method used is to have a common bottom (anvil) cylinder and replace the top cylinder of the set in order to change the circumference size. In either of the above methods, the machine operator must remove and replace either all or a part of the cylinder couple in order to change to a different circumference. In either case, the top cylinder is commonly driven by the bottom (anvil) cylinder by mating gears.

Representative documentation in the field of rotary impact cylinders includes U.S. Pat. No. 4,159,823, issued to J. Bryer et al. on Jul. 3, 1979, which discloses a multiple product folder in a high speed rotary web printing machine having a plurality of operating cylinders and shiftable couplings for changing the speed of certain cylinders.

U.S. Pat. No. 4,207,814, issued to W. D. Schenk on Jun. 17, 1980, discloses apparatus for printing serial numbers with check digits independently applied by a single wheel on a rotating sleeve and the serial numbers being applied by a numbering head.

U.S. Pat. No. 4,380,449, issued to H. B. Michalik on Apr. 19, 1983, discloses a variable size folder cylinder for a rotary printing machine wherein inner and outer support wheels are rotatable so that elements can be variably spaced about the periphery of the folder cylinder.

SUMMARY OF THE INVENTION

The present invention relates to machines for producing business forms. More particularly, the present invention relates to a rotary impact cylinder couple wherein a combined drive system provides a single cylinder couple that emulates various printing cylinder sizes.

In accordance with the present invention, there is provided a rotary impact cylinder couple for enabling a plurality of impacting positions, said couple comprising an anvil cylinder supported for rotation at a precise position along a process line, an impacting cylinder having a plurality of impacting means thereon supported for rotation adjacent said anvil cylinder, means for driving said anvil cylinder, servo-drive means for driving said impacting cylinder, encoding means coupled to the anvil cylinder driving means for providing a speed reference between the anvil cylinder and the servo-drive means, and resolving means operably associated with the servo-drive means for maintaining an exact angular relationship between the impacting cylinder and the anvil cylinder.

In accordance with the above discussion, a principal object of the present invention is to provide a variable size rotary impact cylinder couple operating at desired speeds of rotation.

Another object of the present invention is to provide a cylinder couple wherein the top cylinder of the couple is rotatable at various speeds independent of the speed of the process line.

An additional object of the present invention is to provide a cylinder couple of a standard size that enables the use of various impacting positions on the impacting cylinder.

A further object of the present invention is to provide an impacting cylinder couple arrangement wherein various impacting positions on the impacting cylinder can be obtained while maintaining the cylinder couple in position on the process line.

Additional advantages and features of the present invention will become apparent and fully understood from a reading of the following description taken together with the annexed drawing.

DESCRIPTION OF THE PREFERRED EMBODIMENT

Figure 1:
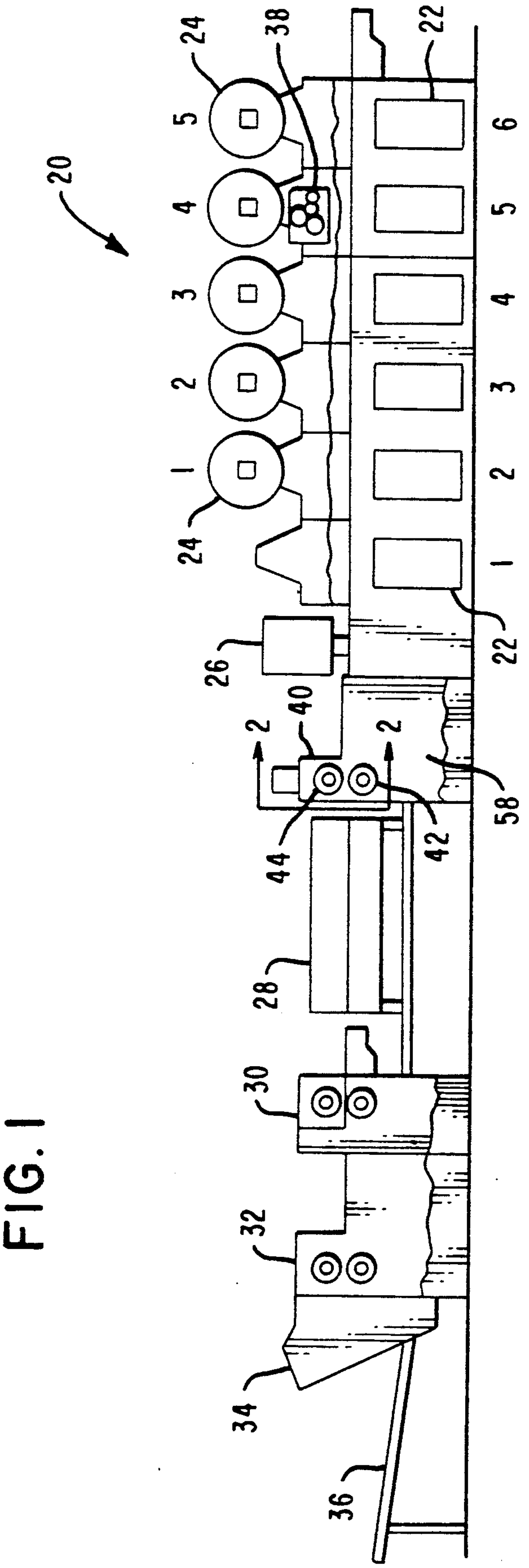
FIG. 1 is a diagrammatic illustration of the elements of a process line and incorporating the subject matter of the present invention.

Prior to discussing the drawing, it is to be noted that the structure of the present invention is applicable for use with collating equipment in the production of business forms. The collating equipment includes at least one high speed cross-web gluing machine that applies lines of glue at precise positions on a web of paper traveling in a path along the process line. Downstream of the gluing machine is the cylinder couple for impacting the cross-web applied glue lines. The impacting operation improves the quality of a collated business form and also provides means for enabling higher process line speeds.

Referring now to the drawing, FIG. 1 is a diagrammatic illustration of a process line that includes a continuous style collator 20 used for the production of business forms. The flow of the paper webs is from right to left and the collator 20 includes a plurality of paper stations, as 22, associated with a plurality of carbon spindles, as 24. The paper stations 22 are numbered 1-6 and the carbon spindles 24 are numbered 1-5 for this particular collator 20. A control panel 26 is provided downstream of the paper stations 22 for use by the operator of the collator 20. A dryer unit 28 and a numbering unit 30 are next in the process line. A cross-perforating cylinder unit 32, a folder unit 34 and a table 36 are included as a part of the collator 20. A cross-web gluing machine 38 is located at the paper station no. 5 and an impactor cylinder couple 40 is provided downstream of the control panel 26.

The structure and arrangement of the present invention provide for a variable size circumference emulation using a standard 22 inch circumference cylinder couple 40 as a preferred embodiment. The cylinder couple 40 is designed to operate on a continuous collator 20 of the type made by Hamilton Tool Company, Hamilton, Ohio, in the process line. The cylinder couple 40 enables the provision of 1, 2, 3, 4, 5, 6, and 8-around impacting positions for the preferred 22 inch circumference cylinder. Other cylinder circumferences adaptable for use with the subject matter of the present invention include 17, 19, 21, 24, 25½ and 28 inches.

Figure 2:
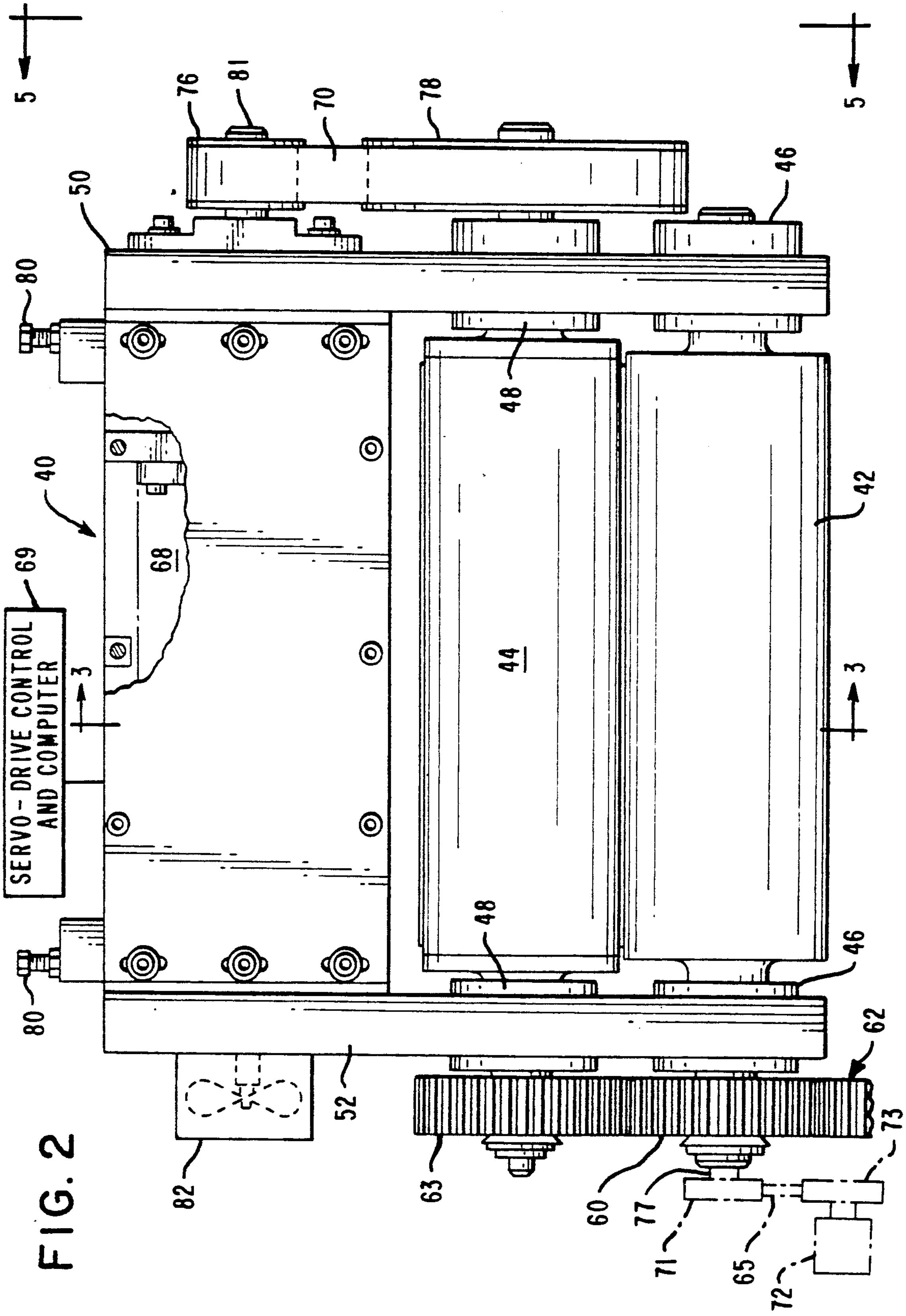
FIG. 2 is an elevational view taken on the line 2—2 of FIG. 1.
Figure 3:
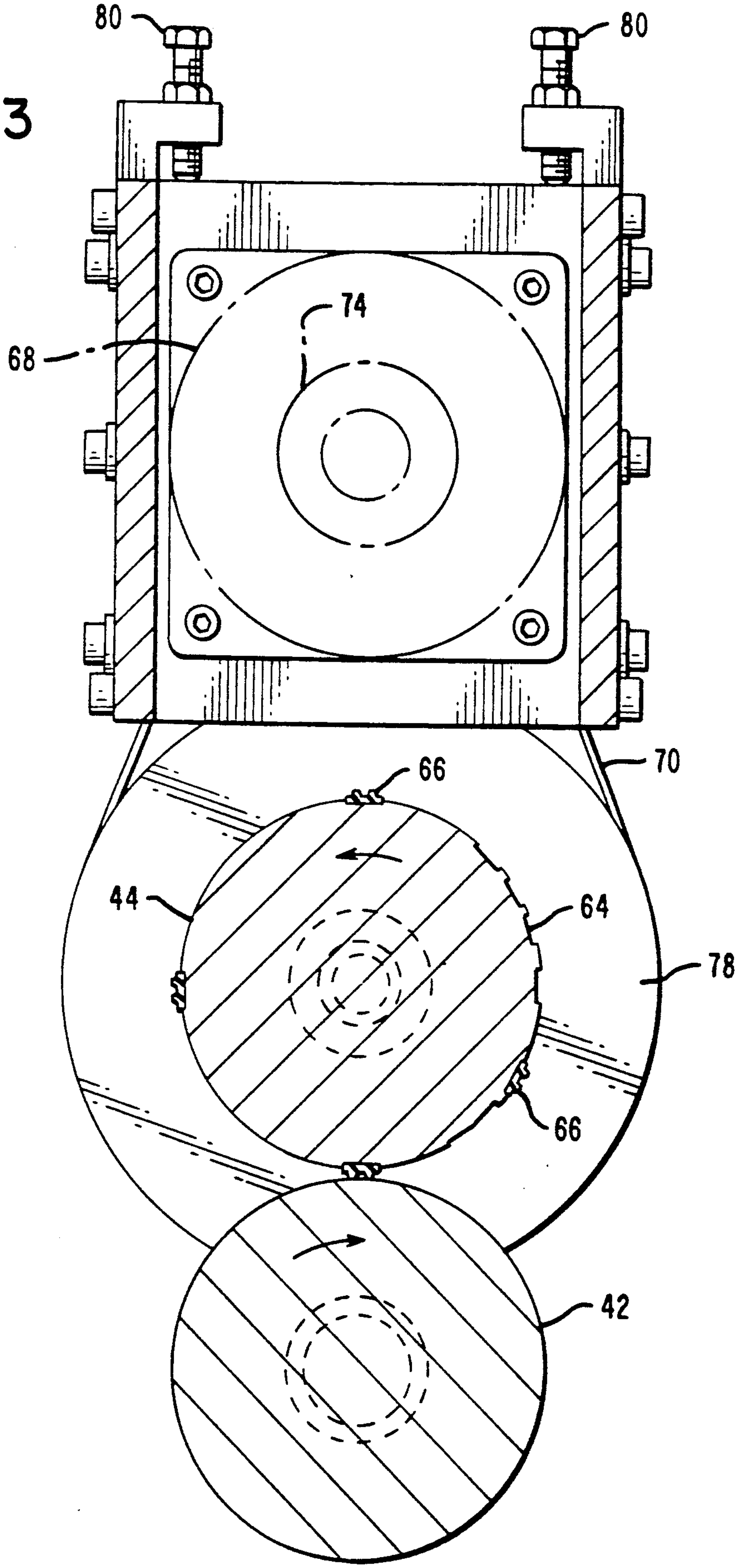
FIG. 3 is an elevational view, partly in section, taken on the line 3—3 of FIG. 2.

A variable size rotary impacting cylinder couple is basically a pair of specially constructed cylinders that are mounted in a pair of side frames. As seen in FIGS. 2 and 3, the impacting cylinder couple 40 is designed as a pair of 22 inch circumference cylinders 42 and 44 journaled in spaced Timken roller bearings 46 and 48 and supported in vertical stacked manner on side frames 50 and 52. The impacting cylinder couple 40 fits into position in suitable side frame slots (not shown) provided on a finishing unit 58 (FIG. 1) that is located downstream of the collating section and upstream of the radio frequency (RF) dryer unit 28 on the Hamilton style continuous collator 20. The anvil (bottom) cylinder 42 of the cylinder couple 40 is made of hardened steel and is swing-gear driven by a drive gear train 62 that is a part of the collator 20. The gear train 62 includes a driven gear 60 and an upper idler gear 63. The impacting (top) cylinder 44 of the couple 40 is made of high strength aluminum in order to reduce the weight and the inertia of the cylinder. The impacting cylinder 44 includes slots 64 on the circumference thereof (FIG. 3) for receiving and mounting rubber strips 66 at the 1, 2, 3, 4, 5, 6 and 8 positions around. The variable size rotary impact cylinder couple 40 can be constructed using one or more cross-perforating blades or cut-off blades. Therefore, by replacing the rubber impacting strips 66 with a blade holding device, the cylinder couple 40 can be used for either an impacting, a cross-perforating or a cut-off cylinder. Impacting, cross-perforating and cut-off cylinder couples are commonly used around the world for the production of collated business forms. The impacting cylinder 44 is driven by a servo-drive controlled motor 68 at a 3.111 to 1.00 reduction ratio by means of a high strength timing belt 70. An encoder or pulse generator 72 (FIG. 2) is coupled to the machine driven anvil cylinder 42 and such encoder 72 is used to provide a reference position between the anvil cylinder 42 and the servo-drive motor 68. The encoder 72 measures and indicates an exact rotary position of the anvil cylinder 42 relative to 22 inches of paper passing the cylinder couple 40. The speed of the cylinder couple 40 goes up and down in accordance with the process line speed which is through the gear train 62 and the drive gears 60 and 63. A resolver 74 (FIG. 3) is built into the servo-drive motor 68 and is coupled with the servo-drive control for the motor so as to maintain the exact angular relationship between the impacting cylinder 44 and the anvil cylinder 42. One revolution of the anvil cylinder 42 is equal to 22 inches of web passing through the collating machine 20.

Figure 4:
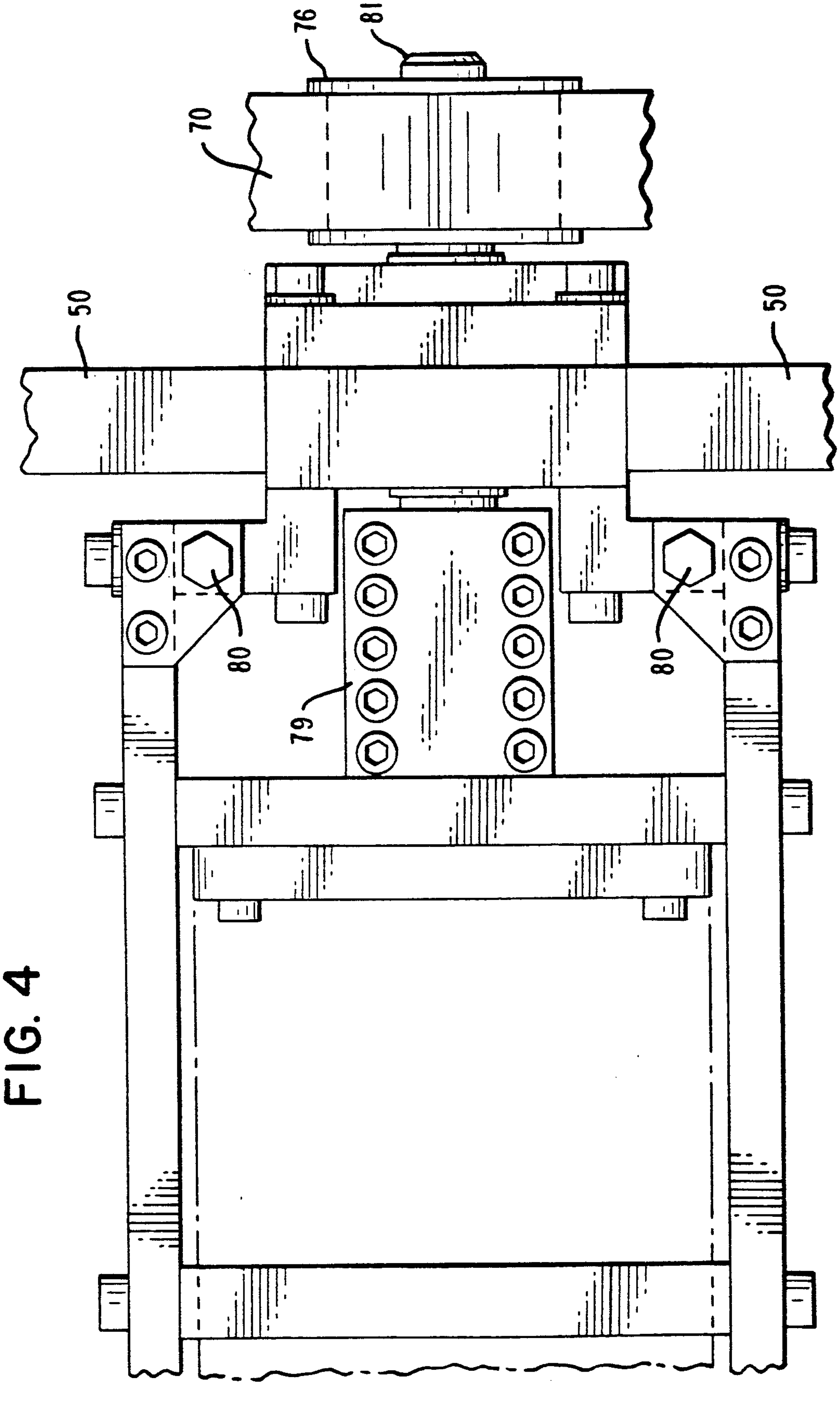
FIG. 4 is a plan view showing one end of a frame for supporting certain structure of the present invention.
Figure 5:
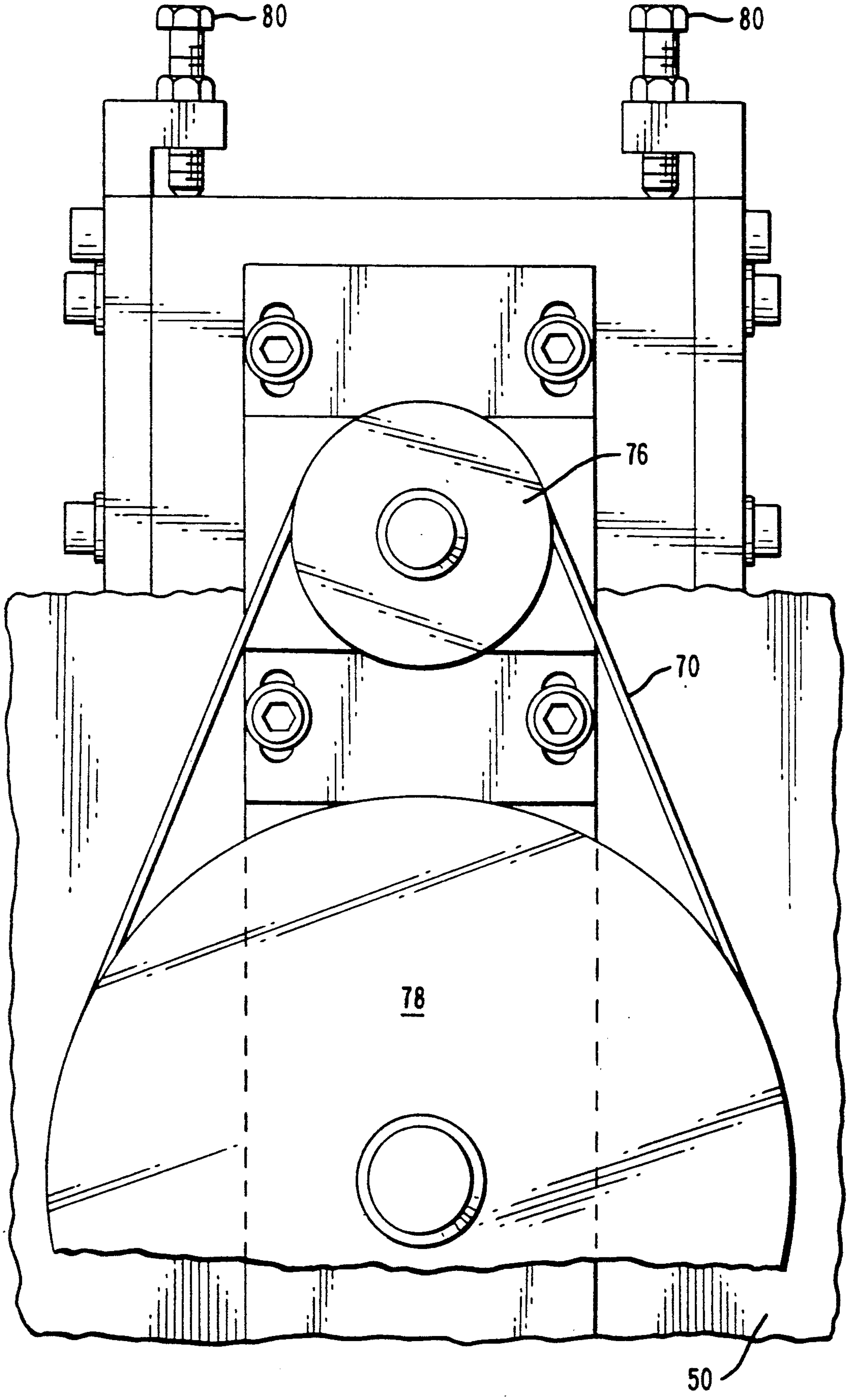
FIG. 5 is an elevational view, taken on the line 5—5 of FIG. 2 and showing a timing belt drive for the impacting cylinder of the present invention.

The servo-drive motor 68 is mounted on a separate support structure (FIGS. 4 and 5) that allows the motor to be raised and lowered and provides adjustment in a vertical direction to enable mounting of the timing belt 70 and also to enable adjustment of the belt. The mounting structure for the servo-drive motor 68 and the timing belt pulleys 76 and 78 is provided by four jack screws 80 which support and provide adjustment for the motor 68 and the frame structure and provide for parallel alignment of the pulleys 76 and 78. The jack screws 80 also provide a means to adjust the belt tension in order to maintain a zero backlash and a means to ensure that the motor 68, the motor jack shaft and the pulley 76 are parallel with the impacting cylinder 44. The servo-drive motor 68 is mounted above the impacting cylinder 44 (FIGS. 2 and 3) in a manner wherein the total weight of the drive motor 68 is carried by the support structure and the four jack screws 80. Suitable taper lock bushings and seizure type couplings are used for mounting the timing belt pulleys 76 and 78 and to couple the servo-drive motor 68 to the impacting cylinder 44. This method of coupling eliminates keyways, setscrews, and loose fits, thereby eliminating backlash in the servo-drive system. A muffin fan with a shroud 82 (FIG. 2) is provided for cooling the servo drive motor 68.

Referring back to FIG. 2, the idler gear 63 is mounted on the gear side of the top impacting cylinder 44. The idler gear 63 is used to drive auxiliary gears on the collator via the main collator drive motor (not shown) through the cylinder couple 40. The pulse generator 72 is driven by a timing belt 65 coupled to a timing belt pulley 71 attached to the anvil cylinder bearing journal shaft 77 and coupled to a belt pulley 73. The pulse generator 72 provides a reference input signal that is used by the servo drive control. One revolution of the bottom anvil cylinder 42 equals 22 inches of paper web length. The servo-drive motor 68 is provided with a built-in resolver 74 (FIG. 3) to provide an input signal to the servo-control unit and thus identify the exact radial position of the servo-drive motor 68 which in turn is coupled to the impacting cylinder 44 via the seizure type coupling 79, the small input pulley jack shaft 81, the input timing belt pulley 76, the timing belt 70 and the large diameter timing belt pulley 78 attached to the impacting cylinder 44. Thus, via a predetermined ratio factor of 3.111:1 between the input drive and the impacting cylinder 44, the position and speed of the impacting cylinder 44 relative to the zero starting position of the bottom anvil cylinder 42 is known at all times.

The servo-drive system for the servo-drive motor 68 includes control circuitry and a computer represented diagrammatically by block 69 in FIG. 2, and provides a repetitive pattern for each revolution of the 22 inch circumference cylinder 44. If the required cylinder circumference is 22 inches, then the impacting cylinder 44 must rotate at exactly the same speed as the anvil cylinder 42. The 22 inch circumference is measured on the pitch line of the gears 60 and 63 for the anvil cylinder 42 and the impacting cylinder 44. The 22 inch circumference arrangement is not speed restricted since said arrangement is readily adaptable for the servo-control system to match and maintain surface speeds between the impacting cylinder 44 and the anvil cylinder 42.

Figure 6:
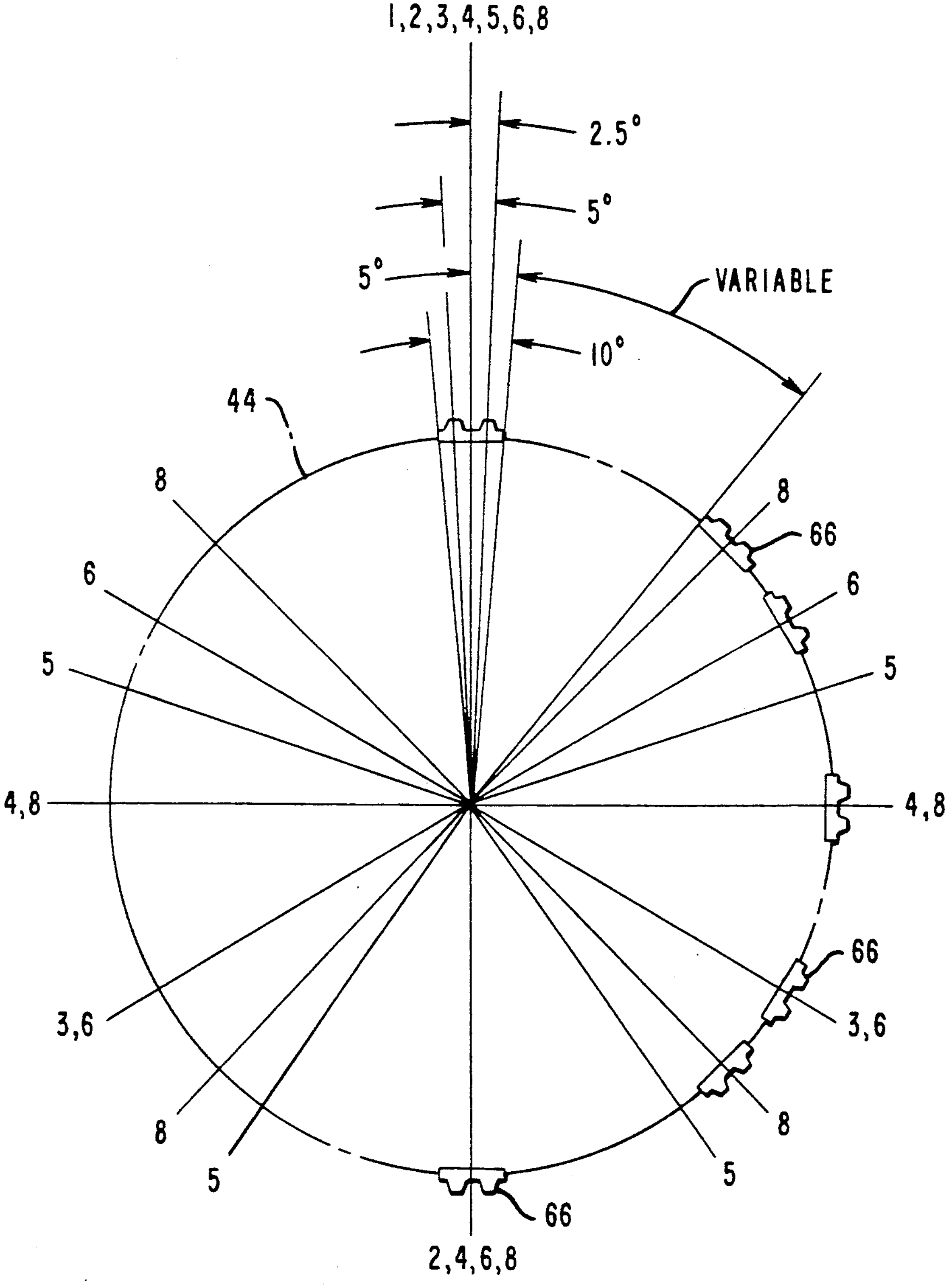
FIG. 6 is a diagrammatic view illustrating the cylinder around positions for the impacting members of the impacting cylinder.

FIG. 6 is a diagrammatic view illustrating the 1, 2, 3, 4, 5, 6 and 8-around positions on the 22 inch cylinder 44. The rubber strips 66 may be inserted into the slots 64 at desired positions on the surface of the cylinder 44.

When it becomes necessary for the 22 inch cylinder to emulate another circumference size, such as 17 inch - 4-around, then the problem of jumping ahead one and one-quarter inches within each 90 degree quadrant and then matching line speed at the exact moment of impacting would be extremely difficult to solve without the use of the servo-drive system.

As can be seen by the above description, the impacting cylinder 44 is driven and controlled by the servo drive system. The bottom anvil cylinder 42 is driven and controlled by the collator input drive system. With the above described drive system, the impacting cylinder 44 can be driven momentarily at a speed which is either faster than or slower than or equal to the speed of the bottom anvil cylinder 42. However, in order to prevent tearing the paper plies that are being pulled through the nip gap formed by the positioning of the cylinder couple 40, the rubber strips 66 that are mounted on the outer surface of the impacting cylinder 44, and/or a cross-perforating or cut-off blade, if used, must be traveling at web speed whenever they are passing through an equal line speed zone. The line speed zone is defined as being 5 degrees before and after the centerline point of the rubber strips 66 and/or cross-perforating or cut-off blades and the bottom anvil cylinder 42. The servo drive system is used to perform this speed matching function. In order to better understand the function of the servo-drive system as it relates to this invention, the following procedural example is provided.

1. Remove the two cross-perforating or cut-off blades from the impacting cylinder 44.

2. Place four rubber strips 66 on the circumference of the impacting cylinder 44 using locating positions "4", as shown in FIG. 6 of the drawing.

3. Note that the rubber strips 66 are located 90 degrees apart around the impacting cylinder 44. This pattern of locating the strips is commonly referred to as being 4-around. This pattern matches the printed image of a business form that has been printed 4-around. The cross-web glued stripe or dot patterns are located 4-around on the business form.

4. Other number around combinations are obtained by locating rubber strips 66 at each location that a specific number is located. 6-around has six rubber strips 66 equally spaced around the impacting cylinder 44, the rubber strips 66 being removed at the other locations. The impacting cylinder 44 has been arranged for the combinations of 1, 2, 3, 4, 5, 6, and 8-around when used as an impactor. The cylinder 44 has also been arranged to produce a 1 or 2-around cross-perforating pattern when used for producing an intermediate cross-perforating pattern on a business form.

5. The 4-around pattern shown is used for any printed circumference in the range from 17 inches through 28 inches. The following 4-around combinations would be impacted for each circumference listed:

| CIRCUMFERENCE | 4-AROUND PRINTED FORM SIZE |
|---|---|
| 17" | 4¼" |
| 19" | 4¾" |
| 21" | 5¼" |
| 22" | 5½" |
| 24" | 6" |
| 25½" | 6⅜" |
| 28" | 7" |

6. The basic circumference of the impacting cylinder 44 has been selected to be 22.000 inches. All calculations generated by the servo drive computer control must be made based on a 22.000 inch circumference. Using this basis, one can calculate the difference between a 4-around pattern at 22.000 inches and a 4-around pattern at 17.000 inches.

22"/4=5.500"

17"/4=4.250"

5.500"−4.250"=1.250"

The 1.250 inch calculated difference is the linear distance measured on the circumference of the basic 22.000 inch impacting cylinder 44 that such cylinder must advance in addition to the inherent 5.5000 inch fixed distance in order for the 22.000 inch circumference cylinder to emulate the normal operation of a 4-around 17 inch circumference cylinder. The 1.250 inch gain must be accomplished within an 80 degree arc in order to allow the impacting cylinder to run at line speed within a 10 degree arc (this prevents tearing the web). Thus, it can be seen that the servo-drive control is used to produce four (4) repetitive cycles within one revolution of the impacting cylinder 44. Using this method of control, the invention disclosed herein can be used to emulate a 17 inch circumference or any of the other circumference sizes listed above. The same basic method of calculation explained above is used to calculate the difference required to emulate the other circumferences and number-around requirements listed above. If, for example, a 2-around printed form size of 8½ inches is required for a 17 inch circumference, then the impacting cylinder 44 must advance an additional 2½ inches in addition to the inherent 11 inch fixed distance of the 22 inch circumference in order to emulate a 17 inch circumference 2-around situation. The 2½ inch gain must be accomplished within a 170 degree arc.

NOTE: Servo-drive motor speeds must be retarded momentarily in order to emulate circumferences greater than 22 inches and advanced momentarily to emulate circumferences less than 22 inches.

A complete listing of the sizes that can be emulated by the 22 inch cylinder couple is as follows:

| VARIABLE SIZE ROTARY IMPACTOR FORM SIZES CIRCUMFERENCE | | | | | | | |
|---|---|---|---|---|---|---|---|
| NUMBER AROUND | 17" | 19" | 21" | 22" | 24" | 25½" | 28" |
| | FORM SIZE PRODUCED--INCHES | | | | | | |
| 1 | 17 | 19 | 21 | 22 | 24 | 25½ | 28 |
| 2 | 8½ | 9½ | 10½ | 11 | 12 | 12¾ | 14 |
| 3 | 5⅔ | 6⅓ | 7 | 7⅓ | 8 | 8½ | 9⅓ |
| 4 | 4¼ | 4¾ | 5¼ | 5½ | 6 | 6⅜ | 7 |
| 5 | 3.4 | 3.8 | 4.2 | 4.4 | 4.8 | 5.1 | 5.6 |
| 6 | 2 5/6 | 3 1/6 | 3½ | 3⅔ | 4 | 4¼ | 4⅔ |
| 8 | 2⅛ | 2⅜ | 2⅝ | 2¾ | 3 | 3.1875 | 3½ |

It can be seen from the above description that the variable size rotary impact cylinder couple disclosed herein is truly a variable size rotary impacting unit.

The servo-drive controlled motor 68 can be programmed by means of the computer in the servo-drive system 69 to speed up or to slow down and then run at a constant line speed for a specified time and to repeat the same pattern either one time per revolution of the impacting cylinder 44 or to repeat the same pattern a multiple number of times within a single revolution of the cylinder. A program must be entered by the operator for each different circumference arrangement (17-28 inches as noted above). After a program is entered, the operator either adds or removes pressure sensitive rubber strips 66 on the circumference of the impacting cylinder 44.

A separate control cabinet (not shown) is provided to house the servo-drive controls and computer, a power supply transformer, and an isolation transformer. An operator's control cabinet (not shown) is provided to house programmable controls, selector switches, and pushbuttons that are used to control the servo-drive system.

Figure 7:
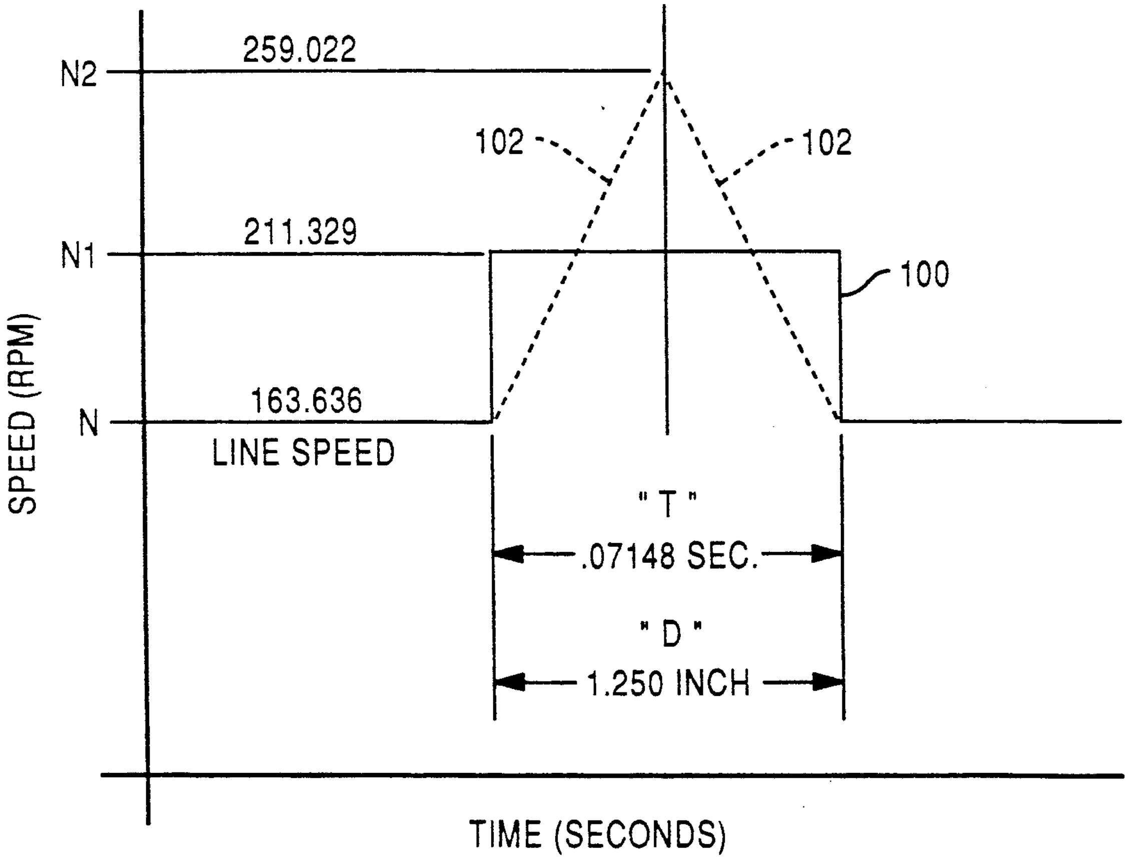
FIG. 7 is a graph showing cylinder speed vs. time for a 17 inch cylinder at 4-around impacting positions and at 300 feet per minute line speed.

FIG. 7 is a graph illustrating impacting cylinder 44 speed in revolutions per minute (RPM) versus time in seconds for a 17 inch cylinder at 4 around positions and at a collator line speed of 300 feet per minute. The object is to move the cylinder a distance of "D" inches in "T" milliseconds at load conditions.

The distance "D" that the impacting cylinder 44 must advance or retard and the time "T" allotted for the move must be determined in order to convert the distance "D" to revolutions per minute. The increase or decrease in revolutions per minute of the impactor cylinder 44 above or below the instantaneous line speed determines the cylinder circumference being emulated by the impacting cylinder 44.

Using the 17 inch circumference - 4-around cylinder emulation previously described above as an example, the distance "D"=1.250 inches. After the distance "D" has been established for any given circumference it remains constant until a different "number around" being emulated is required.

The instantaneous time "T" for the 17 inch circumference at 300 FPM is determined using the following method of calculation: at 300 FPM the distance traveled in 1.0 msec.=300 ft./min.×12 in./ft.×min./60 sec.×sec/1000 msec=0.06 in/msec.

Four around at 22 in. circumference=22 in./4=5.5 in. 5.5 in. divided by 0.06 in./msec.=91.6666 msec. 91.6666 msec. divided by 360 degrees/4=1.0185177 msec./degree.

90 degrees−10 degrees (line speed zone)=80 degrees. 80 degrees×1.0185177 msec./degree=81.481416 msec. 81.481416 msec.−10 msec. (settling time)=71.481416 msec., which is the maximum time "T" in milliseconds allowed to jump 1.250 inches when line speed equals 300 FPM at 4-around.

Using the predetermined distance "D" and the instantaneous time "T", the speed versus time graph shown in FIG. 7 is used to demonstrate the method used to calculate the increase or decrease in speed that is required for the 22 inch circumference cylinder couple to emulate another cylinder circumference. The calculation shown is instantaneous in nature. Referring to FIG. 7, the symbol "N" represents the instantaneous line speed of the rotary collator shown in FIG. 1. The line speed is converted to revolutions per minute, as shown by the calculation for "N" which follows. One revolution of the anvil cylinder 42 is equal to 22 inches of web passing through the collating machine 20.

The symbol "N1" represents the instantaneous speed required, expressed in revolutions per minute, that the impacting cylinder 44 must attain with the acceleration and deceleration times equal to zero in order for the impactor cylinder to either advance or retard a predetermined distance "D".

The instantaneous speed "N1" is converted to revolutions per minute, as shown by the calculation for "N1" which follows.

$$
\begin{aligned}
N1 &= \frac{1.250\ \text{In}}{.07148\ \text{Sec}} \times \frac{\text{Rev}}{22\ \text{In}} \times \frac{60\ \text{Sec}}{\text{Min}} + N \\
&= 47.693\,\frac{\text{Rev}}{\text{Min}} + 163.636\,\frac{\text{Rev}}{\text{Min}} \\
&= 211.329\,\frac{\text{Rev}}{\text{Min}}.
\end{aligned}
$$

The square wave 100 shown in FIG. 7 indicates that the acceleration and deceleration times theoretically both equal zero. However it is obvious that actual instantaneous acceleration and deceleration are impossible. Thus instantaneous change in speed by the servo-drive motor 68 at each corner of the square wave is impossible. Common practice in the design of master/slave servo systems utilizes an acceleration/deceleration curve such as is represented by line 102 in FIG. 7. In FIG. 7, it will be seen that the total time for acceleration and deceleration is divided by two to provide equal times for acceleration and deceleration. The value N2 represents the maximum speed in RPM of the impacting cylinder 44, and is attained at the point at which acceleration ceases and deceleration begins. The required maximum speed N2 is determined by multiplying the difference between the line speed N and the instantaneous speed N1 by two, and adding this amount to the line speed N. The upper envelope line of the square wave 100 is located at the RPM value of N1. Thus the method illustrated in FIG. 7 provides the value of the maximum speed N2 which must be obtained in order to produce the desired value of speed N1 in a given period of time "T" in order to advance or retard the impacting cylinder a predetermined distance "D". In the illustrated example of FIG. 7, with a line speed N of 300 FPM, which is equal to 163.636 RPM, and a required instantaneous speed N1 of 211.329 RPM, the maximum speed of the impacting cylinder 44 is 259.022 RPM.

After the distance "D" has been converted to revolutions per minute (RPMs), then the output signal (pulses) of the encoder 72 (FIG. 2) rated at 4096 pulses per revolution is used to convert the RPMs to electrical pulses to provide a signal the computer can recognize. With the anvil cylinder 42 being the master and the servo-drive motor 68 being the slave, then any change in RPM required at the motor to emulate a specific cylinder circumference and number around at any instantaneous line speed can be calculated by the computer. The computer in the system 69 then commands the servo-drive motor to either increase or decrease a specific number of pulses based on the distance "D" required to emulate a predetermined circumference and number around. An inherent characteristic of a master/-slave servo drive is its ability to maintain a proportional relationship between the servo-drive motor (slave) and the anvil cylinder (master) from zero speed up to the maximum line speed that has been established by the input program. The motion controller recognizes the "zero position" of the master anvil cylinder 42 via a proximity switch at each complete revolution of the anvil cylinder. The computer will reset to zero on each revolution and thus avoid any accumulation error between the servo drive motor and the anvil cylinder.

The distance that the impacting cylinder 44 must be moved represented by "D", the speed of the servo-drive or slave motor 68 at line speed represented by "N1", the maximum speed of the slave motor 68 represented by "N2", and the calculated total acceleration/deceleration time represented by "T", are used to determine the input requirements for the computer program that is used to command the servo drive motion controller that in turn commands the slave motor 68.

Distance "D", speed "N1" and speed "N2" for FIG. 7 must be converted to electrical pulses in order to develop an input program for the servo drive control system.

Speeds, accelerations and distances are converted to pulses as shown below.

A. 300 FPM collator line speed $$= 300\frac{\text{Ft}}{\text{Min}} \times \frac{\text{Min}}{60\ \text{Sec}} \times \frac{12\ \text{In}}{\text{Ft}} \times \frac{\text{Rev}}{22\ \text{In}} \times \frac{4096}{\text{Rev}}\ \text{Pulses}$$
$$= 11{,}171\ \text{Pulses/Sec.}$$

B. Speed of servo-drive or slave motor 68 at line speed (300 FPM) is 3.111×speed of anvil cylinder (in RPM) or 3.111 times 163.636 RPM equals 509.072 RPM.

$$509.072\frac{\text{Rev}}{\text{Min}} \times \frac{\text{Min}}{60\ \text{Sec}} \times \frac{4096}{\text{Rev}}\ \text{Pulses} = 34{,}753\ \text{Pulses/Sec.}$$

Maximum speed of slave motor 68 at line speed 300 FPM is 3.111 times 259.022 RPM, equals 805.817 RPM.

$$805.817\frac{\text{Rev}}{\text{Min}} \times \frac{\text{Min}}{60\ \text{Sec}} \times \frac{4096}{\text{Rev}}\ \text{Pulses} = 55{,}010\ \text{Pulses/Sec.}$$

C. Required acceleration of the slave motor 68 equals (maximum speed minus- line speed) divided by one half of time T equals $$\left(805.817 - 509.072\frac{\text{Rev.}}{\text{Min.}}\right) \times \frac{1}{.03574\ \text{Sec}} \times \frac{\text{Min}}{60\ \text{Sec}} \times \frac{4096}{\text{Rev}}$$

D. Deceleration is same as acceleration=566,810 Pulses/Sec.[2]

E. Distance impacting cylinder 44 must be advanced=

$$1.250\ \text{Inches} \times \frac{\text{Rev}}{22\ \text{In}} \times \frac{4096}{\text{Rev}}\ \text{Pulses} \times 3.111 = 724\ \text{Pulses.}$$

After the inputs are converted to pulses, they are included in a program that is used to command the servo drive system. Development of such a program is well within the capability of anyone skilled in the art.

The advantages afforded by the present invention include the following:

1. One single unit can emulate many sizes required for the production of business forms.

2. Since it is not necessary to remove a set of cylinders or to change one half of a cylinder set to change to a different circumference, set up time has been reduced considerably.

3. After the initial programs have been entered into memory, the machine operator can call up a required program and the impactor is set up for a different circumference and form size. Rubber strips and cross-perforating or cut-off blades must be added or removed in accordance with the number around required.

4. The impactor unit can be set up to operate as an intermediate cross perforation unit to produce two around forms for a given circumference.

5. The unit can be designed and used to perform as a cutoff unit and still be a variable size unit.

6. Although the servo-driven mechanism has some speed limitations using equally spaced rubber strips or cross-perforating or cut-off blades arranged in a number around concept in conjunction with a servo-drive system, the ability to emulate various circumferences can be very efficient and reduce setup costs considerably.

7. The servo-drive control unit can be designed to operate more than one unit simultaneously. Kilroy Corporation, Dayton, Ohio. The servo main control cabinet is supplied as a separate unit approximately 36 inches×36 inches×18 inches deep. The operator control station can be remotely mounted and is approximately 16 inches×20 inches×12 inches deep.

8. A fail safe brake is included as a part of the servo-drive or slave motor 68. If electrical power is lost, the brake would engage and stop the impacting cylinder immediately.

9. A proximity switch can be mounted on the cylinder couple and be used as a reference position for the servo-control unit.

10. The muffin fan with shrouding is provided for cooling the servo-drive motor.

11. The servo-drive motor 68 has been strategically located for compactness, protection and efficiency.

12. The bearing journals of the impacting cylinder 44 are preferably constructed of steel for durability. The main body of the cylinder is preferably constructed of aluminum.

13. One primary design feature that has been provided is that a cylinder couple 40 has been purposely designed in which both the anvil cylinder 42 and the impacting cylinder 44 have a 22 inch circumference. The 22 inch circumference will produce three commonly used form sizes 5½ inches, 7⅓ inches, and 11 inches without any collator speed limitations. Also, one revolution of the 22 inch circumference anvil cylinder 42 equals exactly 22 inches of web travel. When running any number around at the 22 inch circumference, careful study will show that the servo-drive system must simply maintain the same surface speed at the tangent point of the impactor rubber strips or tooling blades and the anvil cylinder. This very small correction can be easily achieved by the servo-control unit. The cylinder couple 40 can operate at speeds up to approximately 1,000 FPM when it is being used for impacting a 22 inch circumference job. One revolution of the anvil cylinder 42 equals 22 inches of paper being fed by the collator pin band(s).

14. Because the anvil cylinder 42 is driven by the main drive gear train and the servo-driven impacting cylinder 44 is slaved to the speed of the anvil cylinder, the cylinder couple 40 will automatically follow the machine line speed up and down and thus maintain register to within the specified tolerances and control limitations of the servo drive control unit.

15. The impacting cylinder 44 is driven by the servo-drive motor 68 that is slave controlled to the anvil cylinder of the unit couple. This design feature prevents any shock loading from being transmitted back through the gear train of the collator 20. The idler gear 63 mounted on the gear side of the impacting cylinder 44 does not drive the impacting cylinder. All shock loads will be transmitted directly into the framework of the cylinder couple 40 and the main collator machine frame.

16. In an emergency collator stop situation, the 22 inch cylinder couple 40 can be commanded to emulate a 22 inch circumference even though the system has been set up to emulate some circumference other than 22 inches. This function provides a means of control that can be used to prevent tearing of the web if acceleration or deceleration speeds are greater than the system can control in a normal run-mode. When the servo-drive system emulates a 22 inch circumference, the top and bottom cylinders will run at the same surface speed as the paper web.

It is thus seen that herein shown and described is a variable size rotary impact cylinder couple that is self contained and can be used with a rotary collator to produce cross-web glued business forms. The arrangement enables the use of a single cylinder couple to provide a plurality of different settings and emulate various printing cylinder circumference sizes for impacting lines of glue on the business forms. The present invention enables the accomplishment of the objects and advantages mentioned above, and while a preferred embodiment has been disclosed herein, variations thereof may occur to those skilled in the art. It is contemplated that all such variations and any modifications not departing from the spirit and scope of the invention hereof are to be construed in accordance with the following claims.

What is claimed is:

1. For use with a cylinder couple employed in a system for producing business forms, said couple having an anvil cylinder, an impacting cylinder, and a motor for driving said impacting cylinder, a method of emulating impacting cylinders of different circumferences without physically replacing the impacting cylinder in the cylinder couple, comprising the following steps:

(a) selecting a circumference of impacting cylinder to be emulated;
(b) selecting a number around corresponding to the number of forms to be produced by a complete rotation of the impacting cylinder;
(c) placing impacting means on the impacting cylinder corresponding to the number around;
(d) calculating the differential distance which the impacting cylinder must be moved between impacting means to emulate a given circumference;
(e) determining the line speed of business form stock moving the anvil cylinder and the impacting cylinder;
(f) determining the time required for the move of step (d);
(g) determining the instantaneous speed of the anvil cylinder at the line speed of step (e);
(h) determining the speed of the motor for driving the impacting cylinder synchronously with said anvil cylinder;
(i) determining the theoretical speed of impacting cylinder required to produce the desired emulation;
(j) determining the speed of the motor necessary to produce the theoretical speed of the impacting cylinder;
(k) determining the maximum speed of the impacting cylinder necessary to achieve said theoretical speed;
(l) determining the speed of the motor necessary to drive the impacting cylinder at said maximum speed;
(m) converting the line speed of step (e) to electrical pulses;
(n) converting the motor speed of step (j) to electrical pulses;
(o) converting the maximum motor speed of step (l) to electrical pulses;
(p) determining the required acceleration and deceleration rates of the motor;
(q) converting the required rates of step (p) to electrical pulses;
(r) converting the differential distance of step (d) to electrical pulses;
(s) providing a program for driving the motor which includes electrical pulse inputs from steps (m), (n), (o), (q) and (r); and
(t) entering the required electrical pulse values from steps (m), (n), (o), (q) and (r) into the program of step (s).

2. The method of claim 1, also including the following step:

(u) repeating steps (a) to (t) inclusive to provide additional programs for other simulated circumferences and entering electrical pulse data in said programs.

3. The method of claim 2, also including the following steps:

(v) selecting a program for the circumference of impacting cylinder being emulated;

(w) placing impacting means of the type and number required on the impacting cylinder; and (x) operating the system to produce business forms utilizing the desired emulated circumference of impacting cylinder.

* * * * *

UNITED STATES PATENT AND TRADEMARK OFFICE
CERTIFICATE OF CORRECTION

PATENT NO. : 5,131,966

DATED : July 21, 1992

INVENTOR(S) : James B. Coffey

It is certified that error appears in the above-identified patent and that said Letters Patent is hereby corrected as shown below:

Column 10, line 59, before "Kilroy" insert --The servo drive system can be provided by the Mike--.

Column 12, line 26, after "moving" insert --between--.

Signed and Sealed this

Fifteenth Day of February, 1994

Attest:

BRUCE LEHMAN

Attesting Officer

Commissioner of Patents and Trademarks